Aug. 2, 1938.  W. J. RALPH, JR  2,125,693
DESSERT FREEZER
Filed March 23, 1936  5 Sheets-Sheet 1

Inventor
WALTER J. RALPH, JR.

By Clarence A. O'Brien
Attorney

Aug. 2, 1938.   W. J. RALPH, JR   2,125,693
DESSERT FREEZER
Filed March 23, 1936   5 Sheets-Sheet 2

Inventor
WALTER J. RALPH, JR.

By Clarence A O'Brien
Attorney

Aug. 2, 1938.    W. J. RALPH, JR    2,125,693
DESSERT FREEZER
Filed March 23, 1936    5 Sheets-Sheet 3
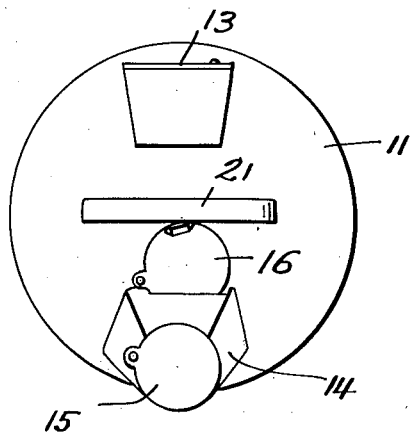
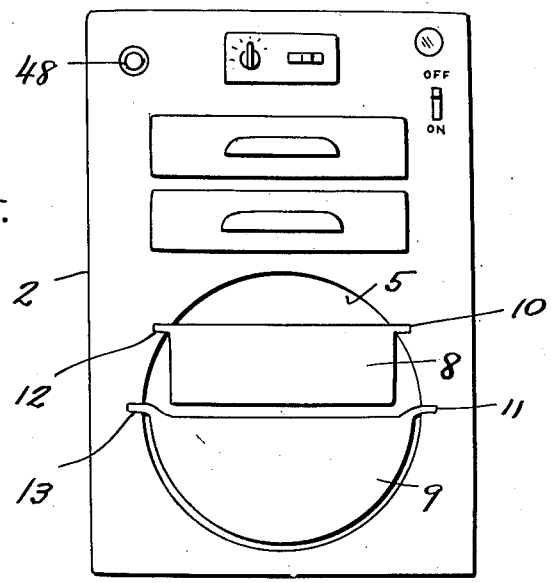
Inventor
WALTER J. RALPH, JR.
By Clarence A O'Brien
Attorney

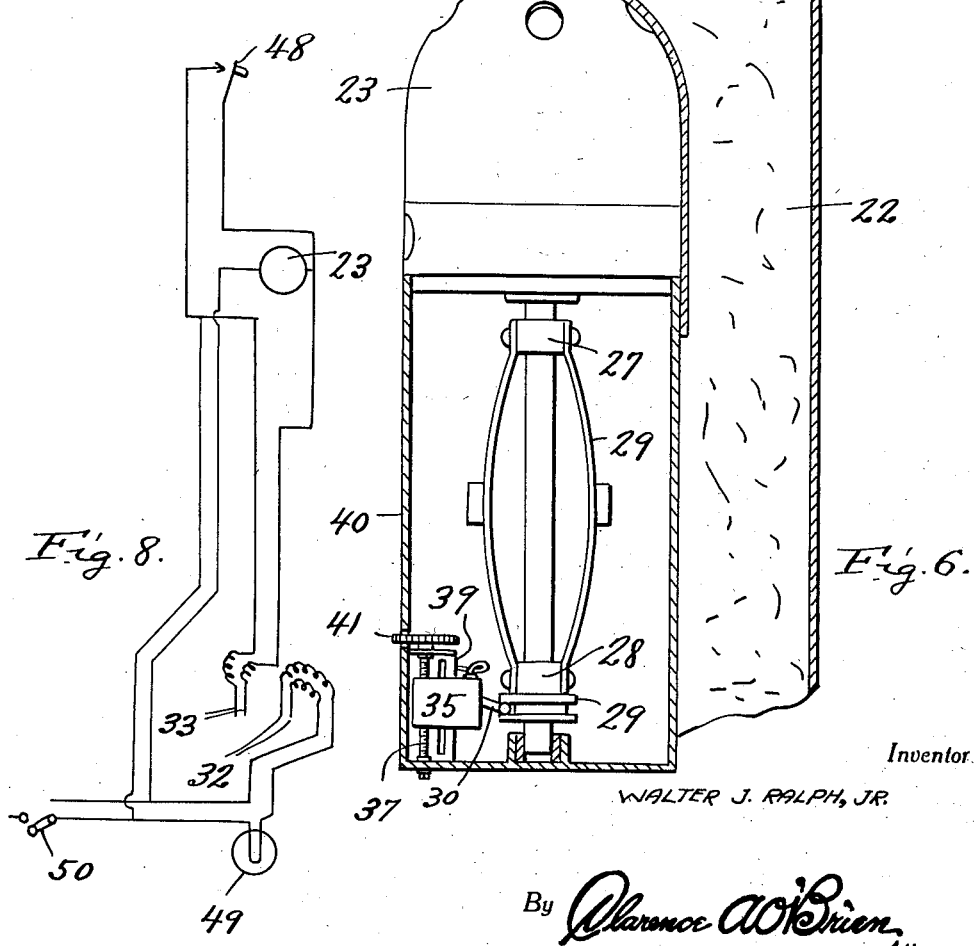

Aug. 2, 1938.  W. J. RALPH, JR  2,125,693
DESSERT FREEZER
Filed March 23, 1936  5 Sheets-Sheet 5

Inventor
WALTER J. RALPH, JR.

By Clarence A O'Brien
Attorney

Patented Aug. 2, 1938

2,125,693

UNITED STATES PATENT OFFICE 2,125,693

DESSERT FREEZER

Walter J. Ralph, Jr., Oakland, Calif.

Application March 23, 1936, Serial No. 70,532

2 Claims. (Cl. 62—116)

This invention relates to the freezing of desserts, such as ice-cream, sherbet, etc., in the freezing unit of mechanical refrigerators, especially electric refrigerators; and among the objects of the invention are the provision of a simple power driven agitator-equipped freezing unit, and means for automatically stopping the agitator mechanism when the dessert mixture has thickened to the proper consistency, and also to the end that the driving motor will be protected from a dangerous overloading thereof; as well as to include in such a unit an electrical signalling device for indicating when the driving motor stops or is at rest.

The invention together with its objects and advantages will be best understood from a study of the following description taken in connection with the accompanying drawings wherein:

Figure 4 is an end elevational view of the freezing unit.

Figure 5 is an end elevational view of an ice freezing assembly illustrating the use of additional ice trays in lieu of the first freezing unit.

Figure 6 is an enlarged detail view partly in section and partly in elevation showing the drive means for the paddle or agitator together with a governor and switch controlled thereby for controlling the circuit to the driving motor and the electrical signalling element.

Figure 7 is an end elevational view of a driven shaft.

Figure 8 is a wiring diagram.

Figure 10 is a view taken substantially at right angles to Figure 9 and illustrating certain details hereinafter more fully referred to.

Figure 1:
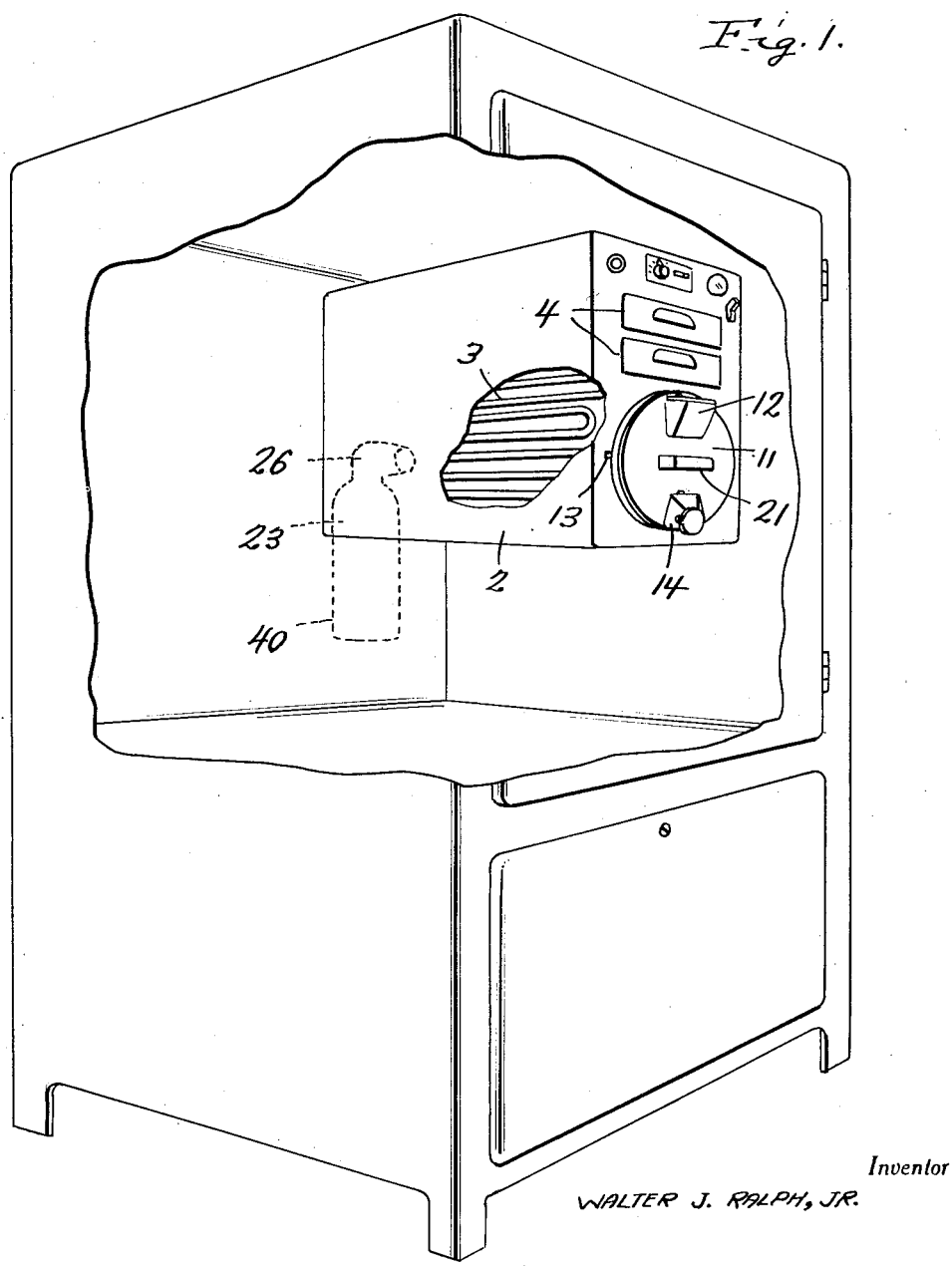
Figure 1 is a perspective view of an electric refrigerator with parts broken away and illustrating the application of the invention.
Figure 2:
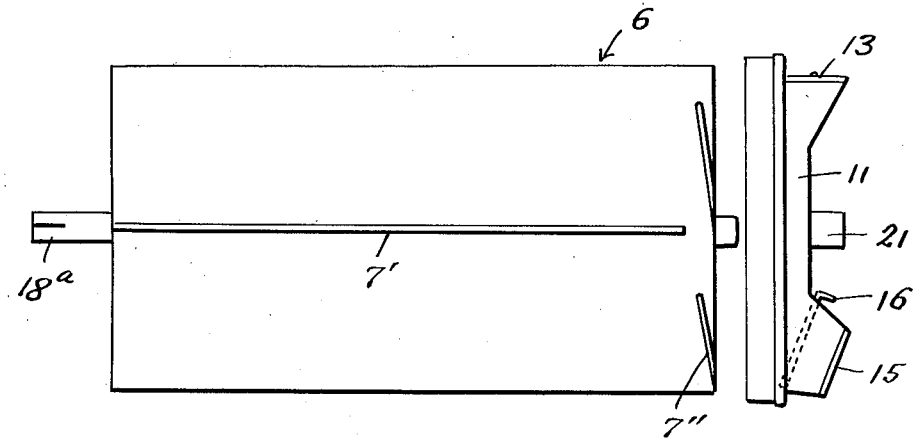
Figure 2 is a side elevational view of the freezing unit with the cap for the container cylinder separated therefrom.
Figure 3:
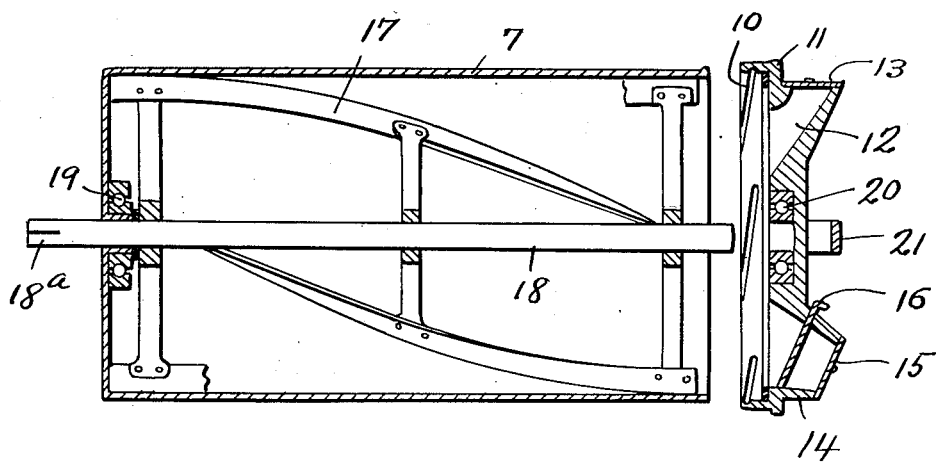
Figure 3 is a sectional view through the parts shown in Figure 2.

Referring to the drawings more in detail it will be seen that 1 indicates generally a conventional electrical refrigerator which includes among other parts a freezing unit consisting of a suitably mounted casing 2 having freezing coils 3 therein and also accommodating ice cube trays 4.

In accordance with the present invention beneath the trays 4 the member 2 is provided with a chamber 5 of substantially cylindrical shape adapted to accommodate the improved dessert freezer indicated generally by the reference numeral 6, and in lieu of said freezer, trays, or pans 8 and 9 respectively used for freezing ice or for similar purposes.

The pans 8 and 9 as shown are provided with lateral longitudinally extending flanges 10 and 11 respectively accommodated in ways or guide grooves 12 and 13 respectively provided in diametrically opposite portions of the wall of the chamber 5.

The aforementioned freezing unit 6 comprises a cylindrical casing 7 adapted to receive dessert-mix, and the cylinder 7 is provided at opposite sides thereof with ribs 7' adapted to be accommodated in the aforementioned ways or grooves 13 for supporting the cylinder 7 within the chamber 5.

At its opened end the cylinder 7 is provided with suitable threads 7" to accommodate the threads or grooves 10 formed internally of a cap 11 provided for the open end of the cylinder 7.

Cap 11 has formed integrally therewith an intake spout 12 equipped with a suitable closure 13 and a discharge spout 14 equipped with a suitable closure 15 and also with a sliding valve 16.

Suitably arranged within the cylinder 7 is a paddle or agitating device indicated generally by the reference numeral 17 and fixed to a shaft 18 journaled in bearings 19 and 20 respectively, bearing 19 being suitably provided at the inner or closed end of the cylinder 7 and bearing 20 being suitably provided within the cap 11, which latter, it will also be noted, is provided with a suitable handle 21.

For driving the paddle 17 there is suitably mounted within a recess provided in the rear walls 22 of the refrigerator casing an electric motor 23 in driving engagement with a suitable shaft 24 through the medium of suitable gearing 25 encased in a suitable gear case 26. Shaft 24 at one end is provided with a clutch socket 27 complemental to the end 18a of shaft 18 for transmitting drive from the motor 23 to said shaft 18 for revolving the agitator or paddle 17.

On the armature shaft of the motor 23 there is provided a centrifugal governor which is of conventional structure including a fixed collar 27, a slidable collar 28, collars 27 and 28 being connected with weight equipped spring arms 29 so that as these arms 29 swing outwardly under action of centrifugal force collar 28 will be caused to move longitudinally of the motor shaft.

Collar 28 has a groove 29 in which is engaged one end of a switch tripping lever 30.

Figure 9:
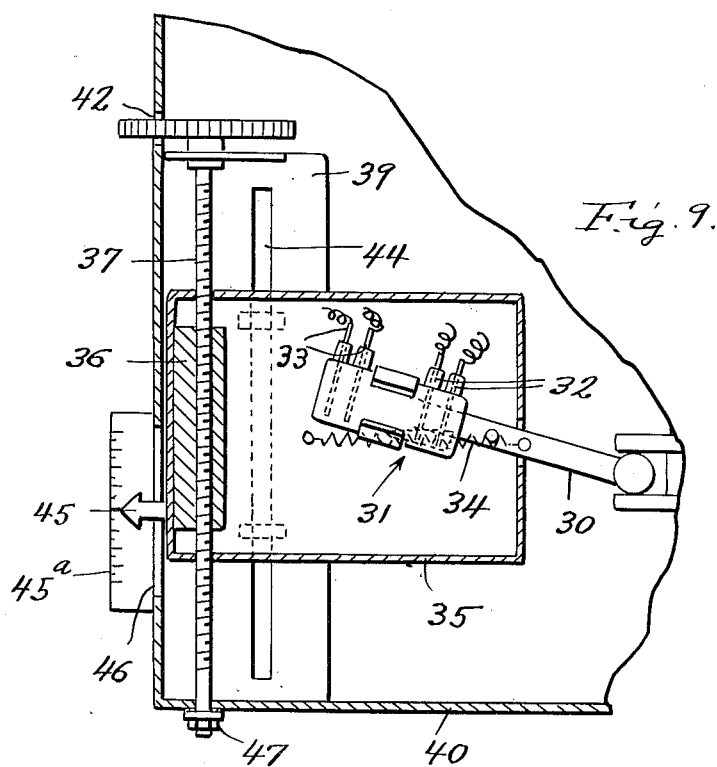
Figure 9 is an enlarged view partly in section and partly in elevation showing more fully the mercury switch and associated parts.

The lever 30, as best shown in Figure 9 is suitably connected with a double, mercury switch indicated generally by the reference numeral 31.

The switch 31 includes a pair of cooperating contacts 32 and a second pair of cooperating contacts 33, the mercury in the switch being shiftable from one end to the other thereof for completing the circuit through either the contacts 32 or the contacts 33 as the case may be. Said switch is also biased in one direction through the medium of a suitable coil spring 34.

Figure 10:
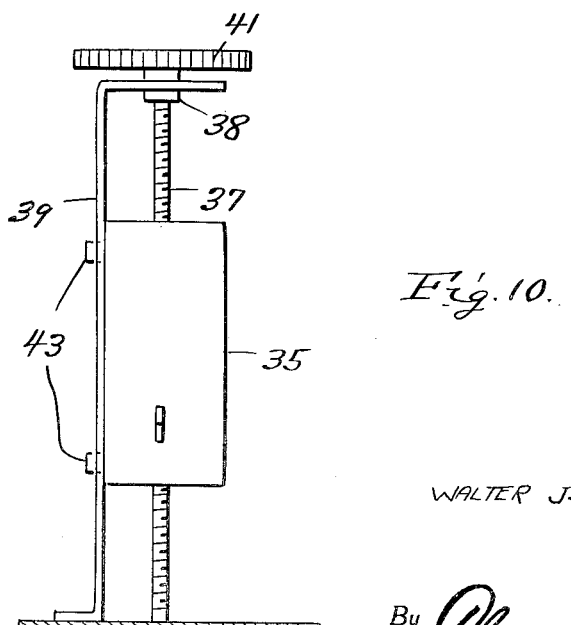

The switch 31 is arranged in a suitable housing 35 which at one end is provided internally with a threaded block 36 through which is threaded an adjusting screw 37 the upper end of which extends through a suitable bearing 38 provided in the upper end of a bracket 39 suitably mounted within a casing 40 housing the governor, casing 35 and bracket 39. On its upper end the adjusting screw 37 is provided with a knurled knob 41 a portion of which extends through a suitable opening 42 in the wall of the casing 40 to the end that the screw may be rotated for adjusting the housing 35. Housing 35 is held against swinging movement through the medium of lugs 43 on one side thereof operating in a suitable slot 44 provided in the vertical part of the bracket 39 as clearly shown in Figures 9 and 10.

Also on the outer side of the casing 40 is a dial provided with graduations 45a against which is read the pointer 45 projecting from one end of the casing 35 and operating through a slot 46 in the adjacent end of the casing 40, as shown in Figure 9. Thus by reading the pointer 45 against the graduations 45a the position to which the member 35 has been adjusted can be readily ascertained and the time interval for shifting the switch 31 predetermined.

In connection with the above it will be noted that the screw 37 is secured against vertical movement through the medium of a suitable lock nut and washer 47.

As will be clear from the wiring diagram in Figure 8 the electric motor 23 is arranged in circuit with a suitable switch 48 of the spring type suitably mounted on the unit casing 2 as shown in Figure 5. Switch 48 is of such construction that pressure thereon must be maintained in order to complete the circuit through the switch for initially setting the motor 23 in operation.

Arranged in circuit with the contacts 32 is an electric signal light 49 also suitably mounted on the casing unit 2 as best shown in Figure 5 and arranged in circuit with the light 49 is a snap switch 50 that is also mounted on the casing unit 2 as shown in Figure 5.

From the description of the invention it will be apparent that when used for freezing desserts the unit 6 may be placed bodily within the chamber 5 and the mix poured into the cylinder 7 through the inlet 12. Also in this connection when for any reason it is desired to have any of the contents of the cylinder 7 discharged therefrom the same will be accomplished by a discharging of such material through the outlet 14, slide valve 16 and closure 15 being of course in open position to permit such a discharge.

To set the device in operation the operator pushes in on the switch 48 for closing the circuit to the motor 23.

In connection with the above it will be understood that normally switch 50 is open while switch 31 is in the position shown in Figure 9. Thus when initiating operation of the device switch 50 is manually closed momentarily completing the circuit through the signal light 49. However as the speed of the motor 23 increases collar 28 of the centrifugal governor moves upwardly to trip the switch 31 thus breaking the circuit to the light 49 and completing the circuit to the motor 23 through the contacts 33. Pressure on the switch 48 is released so that this switch automatically opens, the circuit through the motor 23 being maintained now through the closed switch contacts 33.

When the mixture is whipped to a desired consistency it will be apparent that opposition by said mixture will be offered to the paddle 17 with the result that the speed of the motor 23 will decrease. As the speed of motor 23 decreases collar 28 moves to its normal position finally resulting in a tripping of the switch 31 for returning the switch to a normal position shown thus cutting out the motor 23 and again completing the circuit through the contacts 32 for illuminating the signal lamp 49. Through the medium of the tell-tale light 49 the operator will then be apprised of the fact that the mixture has thickened to the desired consistency.

It is thought that a clear understanding of the construction, operation, utility and advantages of an invention of this character will be had from the foregoing.

Having thus described the invention, what is claimed as new is:

1. In a refrigerator, the combination with a food container, and an agitator in the container including a horizontally disposed operating shaft extending adjacent to the rear wall of the refrigerator, of a drive for the operating shaft comprising a motor set into the back of said rear wall below the operating shaft and having a vertically disposed armature shaft, operating connections between the upper end of the armature shaft and the rear end of the operating shaft and extending through said rear wall, and a housing surrounding said connections and sealing the same exteriorly of said wall.

2. In a refrigerator, the combination with a food container therein, and an agitator in the container including a horizontally disposed operating shaft, of a drive for the operating shaft comprising a motor mounted on the refrigerator below one end of said shaft with the armature shaft thereof vertically disposed and extending at its upper and lower ends beyond said motor, operating connections between the upper end of the armature shaft and said end of the operating shaft, a governor on the lower extending end of the armature shaft, a housing depending from said motor in enclosing relation to the governor, a motor energizing circuit, circuit controlling means including a vertically rocking switch in said housing to which said governor is operatively connected, said switch being mounted in the housing for vertical adjustment bodily to vary the throw thereof by said governor, and means to adjust the switch in predetermined degree from the exterior of said housing.

WALTER J. RALPH, Jr.